(12) United States Patent  (10) Patent No.: US 9,211,898 B2
Stewart et al.  (45) Date of Patent: Dec. 15, 2015

(54) GOLF TROLLEY

(71) Applicant: Stewart Golf Limited, Kings Stanley (GB)

(72) Inventors: Mark Adam Stewart, Cheltenham (GB); Duncan Ross Stewart, Gloucestershire (GB); Jon Stewart Miller, Gloucester (GB); David Michael Funnell, Gloucester (GB)

(73) Assignee: Stewart Golf Limited (GB)

( * ) Notice: Subject to any disclaimer, the term of this patent is extended or adjusted under 35 U.S.C. 154(b) by 0 days.

(21) Appl. No.: 14/465,980

(22) Filed: Aug. 22, 2014

(65) Prior Publication Data

US 2015/0054239 A1  Feb. 26, 2015

(30) Foreign Application Priority Data

Aug. 23, 2013 (GB) .................................. 1315099.0

(51) Int. Cl.
| | | |
|---|---|---|
| *B62B 1/12* | (2006.01) | |
| *B62B 3/02* | (2006.01) | |
| *A63B 55/08* | (2006.01) | |
| *B62B 3/10* | (2006.01) | |
| *B62B 3/12* | (2006.01) | |

(52) U.S. Cl.
CPC ................ *B62B 3/022* (2013.01); *A63B 55/08* (2013.01); *B62B 3/102* (2013.01); *B62B 3/106* (2013.01); *B62B 3/12* (2013.01); *A63B 2210/50* (2013.01); *B62B 2202/404* (2013.01)

(58) Field of Classification Search
CPC ...... B62B 1/12; B62B 2205/12; B62B 1/002; B62B 3/02; B62B 1/125; B62B 2202/24
USPC .............. 280/651–658, 47.31, 645, 646–647, 280/642, 639, 47.315, DIG. 6
See application file for complete search history.

(56) References Cited

U.S. PATENT DOCUMENTS

| 5,540,296 | A | 7/1996 | Strothmann | |
|---|---|---|---|---|
| 8,544,871 | B1 * | 10/2013 | Liao | ............................. 280/651 |
| 2002/0096861 | A1 | 7/2002 | Tsai | |
| 2005/0252700 | A1 | 11/2005 | Kitauchi et al. | |
| 2007/0063487 | A1 | 3/2007 | Wu | |
| 2013/0234418 | A1 * | 9/2013 | Reimers et al. | ............... 280/641 |

FOREIGN PATENT DOCUMENTS

| EP | 1900397 A1 | 3/2008 |
|---|---|---|
| GB | 2425284 A | 10/2006 |
| GB | 2455840 A | 6/2009 |
| GB | 2493805 A | 2/2013 |
| WO | 2010091323 A1 | 8/2010 |

* cited by examiner

*Primary Examiner* — Brodie Follman
*Assistant Examiner* — James Triggs
(74) *Attorney, Agent, or Firm* — Invention TO Patent Services; Alex Hobson

(57) ABSTRACT

A golf trolley configured with a foldable chassis, a plurality of wheels for engagement with the ground, the wheels being movable between an operative position and a stowed position, and a handle. The trolley incorporates a gear train in connection with the foldable chassis for folding elements of the chassis with respect to one another and for moving the wheels between the operative and stowed positions. The handle is pivotally mounted to the chassis and includes a first gear, the first gear being in meshing engagement with the gear train for controlling the folding of the chassis by movement of the handle.

15 Claims, 4 Drawing Sheets

GOLF TROLLEY

CROSS REFERENCE TO RELATED APPLICATIONS

This application claims the benefit of and priority to British Patent Application GB 1315099.0 filed on Aug. 23, 2013, entitled Golf Trolley which is currently pending; the entirety of which is incorporated by reference herein.

BACKGROUND OF THE INVENTION

1. Field of the Invention

The present invention relates to a foldable golf trolley for carrying golf clubs, for example around a golf course.

2. Background

Various types of trolley are known for transporting a bag of golf clubs around a golf course. In particular, three wheeled push trolleys are widely available, and typically include a substantially horizontal base, a substantially vertical handle, a pair of rear wheels attached to either side of a rear section of the base, near the handle, and a front wheel attached substantially in front of the base, laterally centred between the two rear wheels.

It is advantageous to provide golf trolleys which are foldable, for efficient storage and transport when not in use. However, a disadvantage of any folding trolley is that folding and unfolding takes time. Typically, the handle and each wheel need to be separately folded away from the base and locked in position.

Various golf trolleys are known which include linkages between the folding parts, so that the handle and all three wheels fold out in a single motion. However, the linkages on such trolleys create obstructions when the golf trolley is in use. They are also susceptible to damage, for example when mounting a golf bag to the trolley. Furthermore, the linkages are unsightly and provide an unwelcome constraint when designing the aesthetic of trolleys.

It is an object of the present invention to reduce or substantially obviate the above mentioned problems.

SUMMARY OF THE INVENTION

According to the present invention, there is provided a golf trolley comprising a foldable chassis, receiving means for receiving a golf bag, a plurality of wheels for engagement with the ground, the wheels being movable between an operative position and a stowed position, and a handle, the trolley further comprising a gear train in connection with the foldable chassis for folding elements of the chassis with respect to one another, and for moving the wheels between the operative and stowed positions, the handle being pivotally mounted to the chassis and including a first gear, the first gear being in meshing engagement with the gear train for controlling the folding of the chassis by movement of the handle.

A gear train for controlling the folding of the chassis by movement of the handle provides for a trolley which can be folded and unfolded in a single action. Use of a gear train allows the moving parts to be mounted close to the chassis, negating the need for unsightly and restrictive external linkages. Use of a gear train also provides flexibility in design, since the relative amount of movement of different parts may be varied simply by changing the gear ratios. For example, a 120 degree movement in the handle could result in a 110 degree movement in the front wheel.

The gear train may be disposed substantially internally of the foldable chassis. The moving parts may be substantially enclosed or covered by the chassis. This may be by covers mounted to the chassis. In this way, the moving parts are protected from damage and are hidden from view.

The gear train may include a first rack, the first rack being in meshing engagement with the first gear of the handle, and in use the first rack moving linearly within the chassis when the handle is pivoted with respect to the chassis.

The handle is a convenient means of controlling folding. When the handle is folded, the first gear rotates and causes the first rack to move linearly within the chassis. In turn, this linear motion may be converted in the gear train to various types of motion for folding other parts of the golf trolley.

A second rack may be provided, the second rack being rigidly attached to the first rack, and the first and second racks being disposed along substantially parallel or in-line axes. The first and second racks may have toothed faces facing in different directions.

The first and second racks may be provided as part of a linearly movable member. The linearly movable member may be, for example, a substantially triangular or square section member having a rack on at least two of its side faces. Alternatively, the first and second racks could be provided as a single continuous rack, for example on the single curved face of a cylindrical member.

The foldable chassis may include a central element and a first side element, the first side element mounting a wheel and being pivotable with respect to the central element. The first and second racks may be slidably mounted to or within the central element. In this way, the sliding racks within the central element provide the backbone of the gear train, with the ability to transport motion throughout the golf trolley. This is done with a single rigid member, providing a simple mechanism which is unlikely to fail. The pivotable side element may be folded inwards with the wheel adjacent the central element in a stowed position, and outwards with the wheel spaced from the central element in an operative position. The folding may be controlled by the movement of the racks within the central section, which in turn may be controlled by the first gear on the pivoting handle.

The first side element may include a second gear, the second gear being in meshing engagement with the second rack, and in use the first side element pivoting with respect to the central element when the first and second racks move with respect to the central element. The second gear may have teeth disposed in a curve, the curve being in substantially the same plane as a longitudinal axis of the first side element. In this way, the first side element may pivot in the plane of the curve, from an operative position substantially below, behind and to one side of the central element, to a stowed position substantially adjacent to and vertically level with the central member. To effect this, the toothed faces of the first and second racks may be at an obtuse angle to one another.

The first side element may be pivotally mounted to its respective wheel, and a first linkage may be provided, the first linkage being pivotally mounted to the central element about a point spaced from the pivotal mount of the first side element to the central element, and the first linkage being pivotally mounted to the wheel associated with the first side element about a point spaced from the pivotal mount between the first side element and the wheel, in use, the wheel pivoting with respect to the first side element as the first side element pivots with respect to the central element. In other words, the wheel may be connected to the central element via both the first side element and the first linkage. The side element and linkage pivot about different points, but rotate adjacent to each other in substantially the same plane. In this way, the ends of the side element and linkage which are attached to the wheel move longitudinally with respect to each other, in a 'push-pull' manner. As such, the wheel pivots on the end of the pair of connectors. Both in the stowed and operative positions, the wheel remains substantially parallel with a longitudinal axis of the central element. This ensures that the wheel is in the correct orientation in the operative position to allow the trolley to be pushed, and to ensure that the wheel folds flat against the central element in the stowed position, keeping the overall size of the folded trolley to a minimum. In other words, the first side element and first linkage form a parallelogram with the wheel and the central element, the angles of the parallelogram changing as the wheel pivots with respect to the central element.

A third rack may be provided, the first, second and third racks being rigidly attached to each other, and the first, second and third racks being disposed along substantially parallel or in-line axes. The first, second and third racks may have toothed faces facing in different directions.

The first, second and third racks may be provided as part of a linearly movable member, which may be, for example, a triangular or square prism, or a cylinder.

The first, second and third racks, whether or not they are provided as part of a single linearly movable member, may be slidably mounted to the central element.

The first, second and third racks may be provided on different substantially flat faces of the linearly movable member, or alternatively the first, second and third racks may be formed continuously around a curved face of the linearly movable member.

The foldable chassis may further include a second side element, the second side element mounting a wheel and being pivotable with respect to the central element. The second side element may be in all respects identical to the first side element, but mounted to the other side of the central element. The first and second side elements may mirror each other, the respective folding mechanisms and the motion of the elements in use being symmetrical about a longitudinal axis of the central element. As the handle is moved, the wheels may move together and at the same rate.

The second side element may include a third gear, the third gear being in meshing engagement with the third rack, and in use the second side element pivoting with respect to the central portion when the first and second racks move with respect to the central portion.

The third gear may have teeth disposed in a curve, the curve being in substantially the same plane as a longitudinal axis of the second side element.

As with the first and second racks, the toothed faces of the first and third racks may be at an obtuse angle to each other.

The second side element may be pivotally mounted to its respective wheel, and a second linkage may be provided, the second linkage being pivotally mounted to the central element about a point spaced from the pivotal mount of the second side element to the central element, and the second linkage being pivotally mounted to the wheel associated with the second side element about a point spaced from the pivotal mount between the second side element and the wheel, in use, the wheel pivoting with respect to the second side element as the second side element pivots with respect to the central element.

The motion of the first and second side elements and their respectively mounted wheels about the central element may be symmetrical.

The wheels pivotally mounted to the first and second side elements may be disposed in planes substantially parallel with a longitudinal axis of the central element, both when the wheels are in the operative position and when they are in the stowed position. This allows for a folded trolley which is packed together as closely as possible.

The gear train may further include a fourth rack, the fourth rack being rigidly attached to the first rack and being spaced from the first rack in an axial direction or a direction parallel with a longitudinal axis of the central element.

The teeth of the first and fourth racks may be parallel with each other.

The first and fourth racks may be rigidly connected to each other via, for example, a push rod. The first and fourth racks may be provided integrally, as part of the same linearly movable member, in which case a central section of the linearly movable member, between the first and fourth racks, will work as a push rod. The central section or push rod may be completely enclosed within the central element. The central section may be narrower than the first and fourth racks to facilitate this.

The foldable chassis may further include a front element, the front element mounting a wheel and being pivotally mounted to the central portion. The front element may include a fourth gear, the fourth gear being in meshing engagement with the fourth rack, and in use the front element pivoting with respect to the central portion when the first and fourth racks moves with respect to the central portion.

The front element may comprise at least one elongate pivoting spar, and preferably comprises a pair of pivoting spars, one pivoting from either side of the central element.

The fourth rack may have a toothed face facing in substantially the same direction as a toothed face of the first rack. In this way, a gear in meshing engagement with the first rack and a gear in meshing engagement with the fourth rack will rotate about substantially parallel axes. As an alternative, the fourth rack may have a toothed face facing in substantially the opposite direction (i.e. at 180 degrees) to the first rack. Again, in this configuration, a gear in meshing engagement with the first rack and a gear in meshing engagement with the fourth rack will rotate about substantially parallel axes.

The fourth gear may have teeth disposed in a curve, the curve being in a plane substantially parallel with and spaced from the or each elongate pivoting spar of the front element. The elongate pivoting spar(s) may be rigidly connected to the axis of rotation of the fourth gear, and mount the wheel associated with the front element.

The elongate pivoting spar(s) may move in a plane parallel with a longitudinal axis of the central element.

The elongate pivoting spar(s) therefore pivot adjacent to the central element of the chassis. The spar(s) mount a front wheel, which may be moved from an operative position in front of and below the central element, to a stowed position below and adjacent to the central element.

The summary of the invention is provided as a general introduction to some of the embodiments of the invention, and is not intended to be limiting. Additional example embodiments including variations and alternative configurations of the invention are provided herein.

BRIEF DESCRIPTION OF THE DRAWINGS

For a better understanding of the present invention, and to show more clearly how it may be carried into effect, reference will now be made by way of example only to the accompanying drawings, in which.

DETAILED DESCRIPTION OF THE ILLUSTRATED EMBODIMENTS

Certain exemplary embodiments of the present invention are described herein and illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Figure 1:
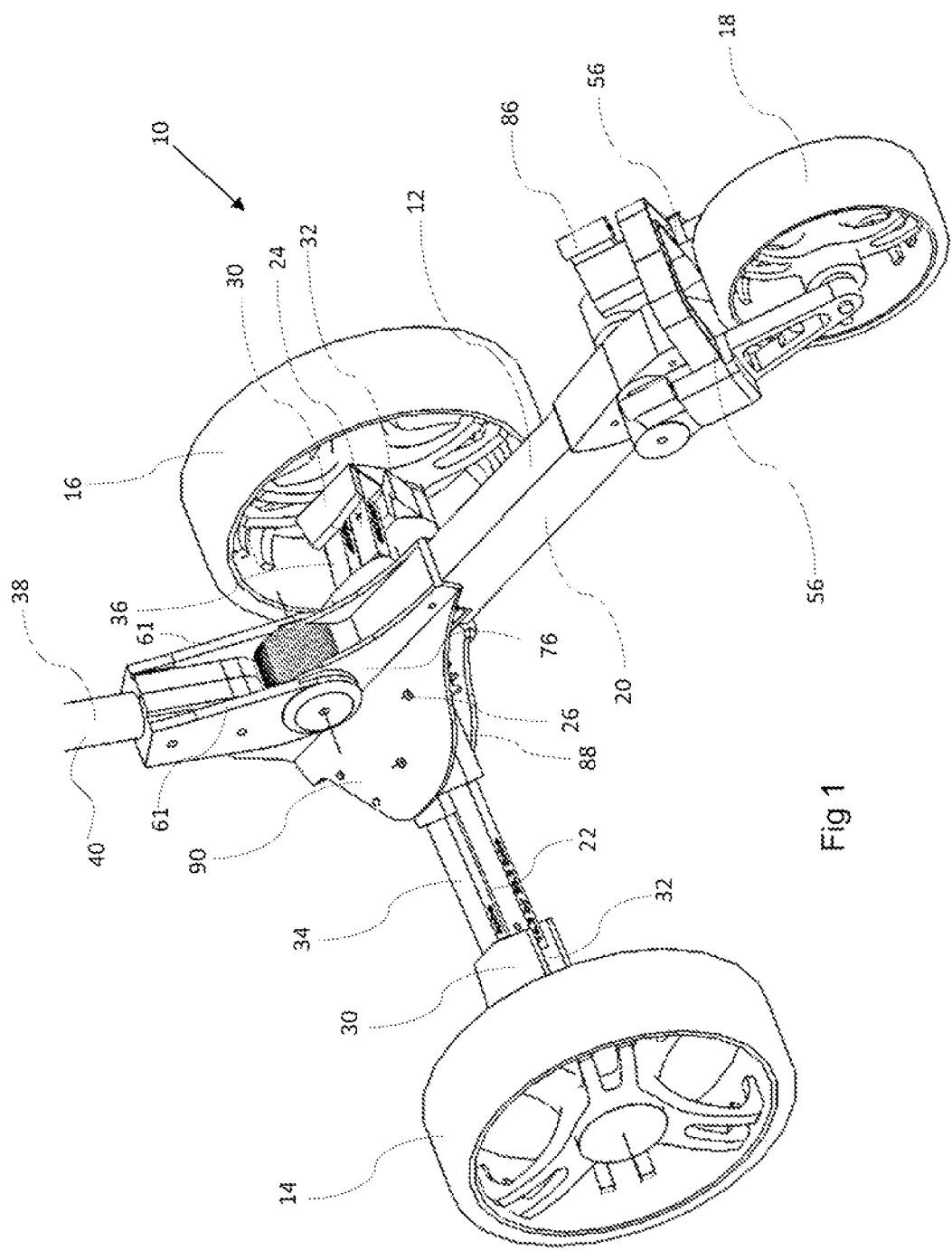
FIG. 1 shows a perspective view of a golf trolley according to the invention, with the wheels in an operative position.
Figure 2:
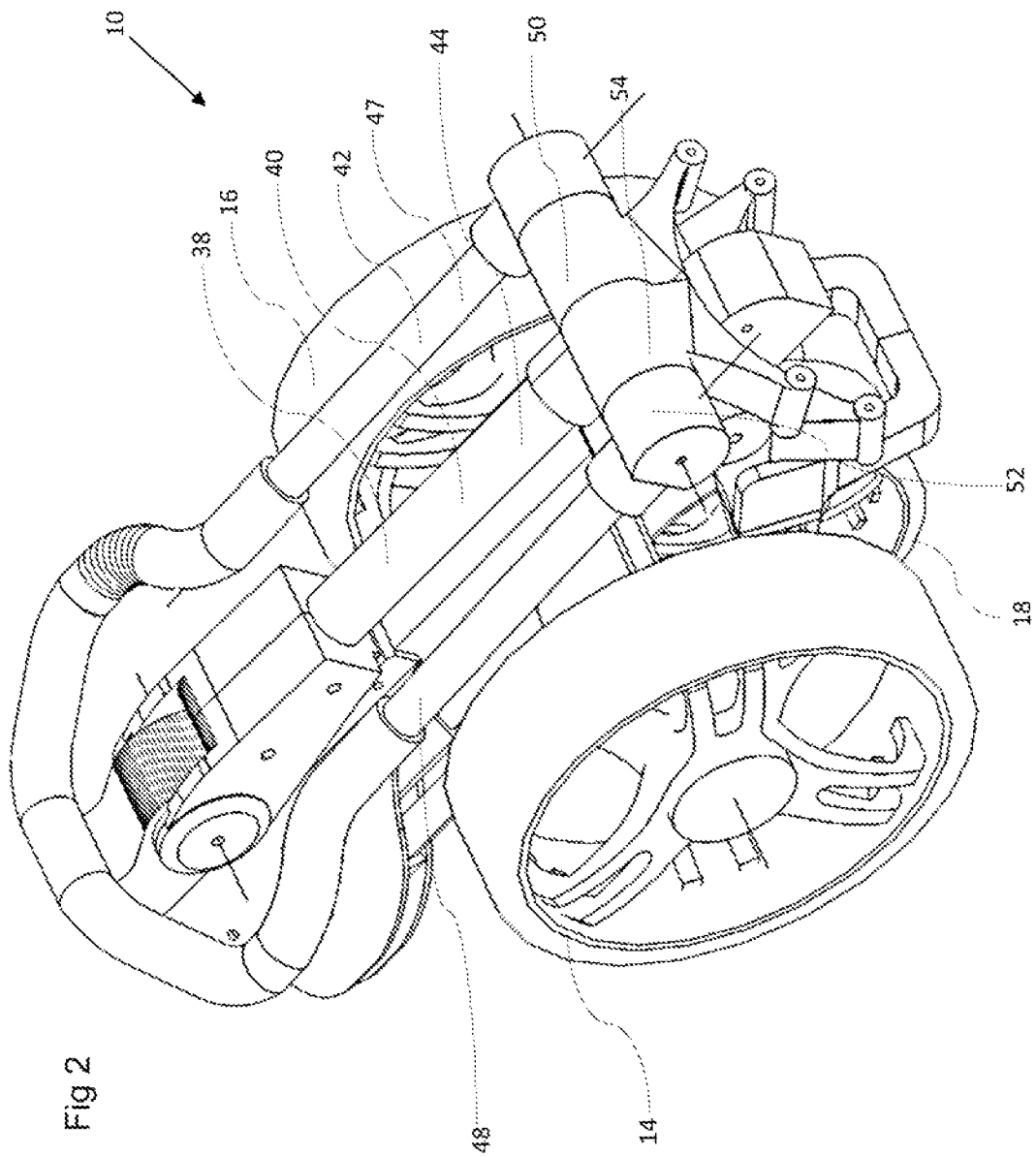
FIG. 2 shows a perspective view of the golf trolley of FIG. 1, with the wheels in a stowed position.
Figure 3:
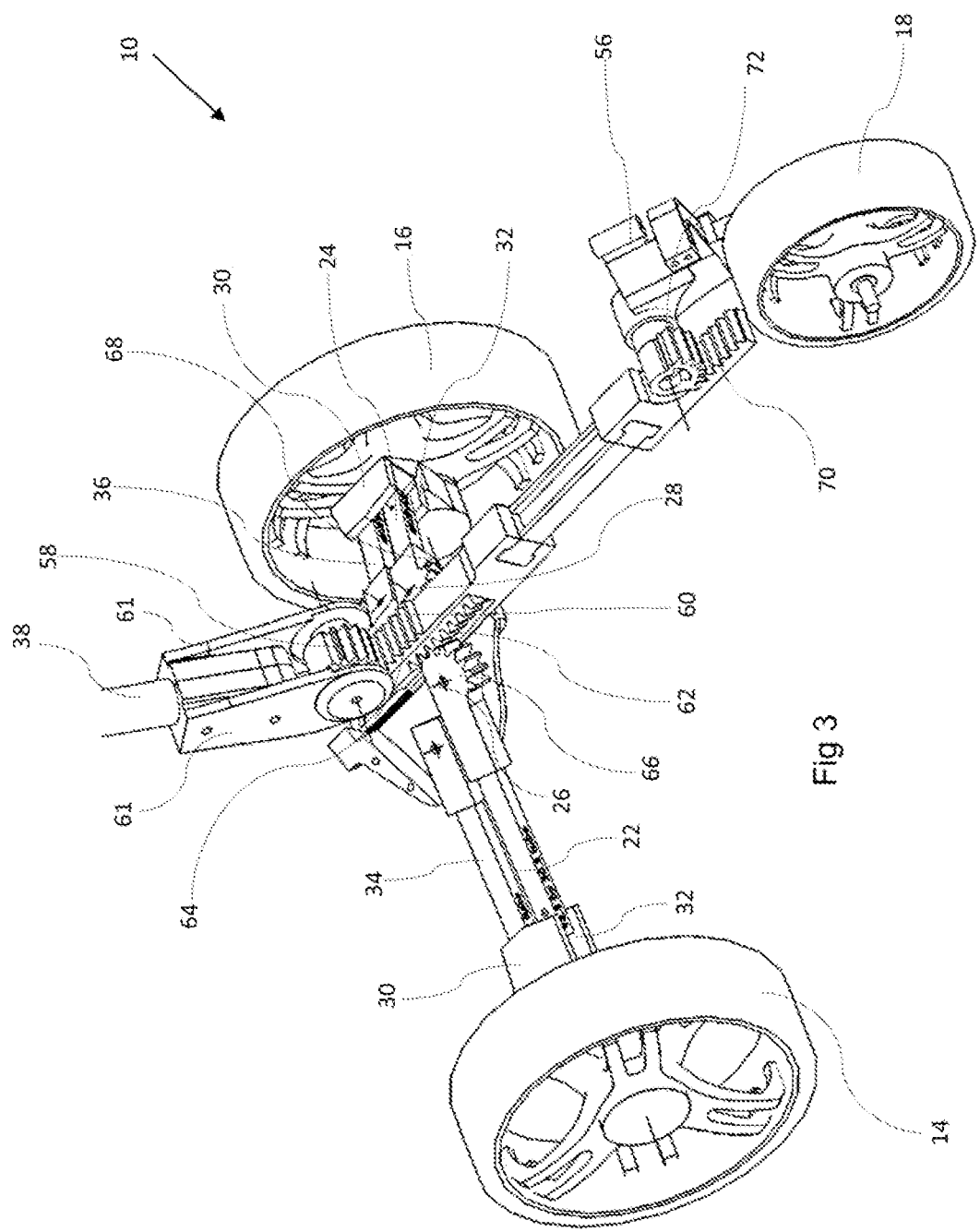
FIG. 3 shows a perspective view of the golf trolley of FIG. 1, with covers removed to reveal the internal mechanism.

Referring to FIGS. 1 to 3, a foldable golf trolley is indicated generally at 10. The golf trolley is a three-wheeled push trolley, and includes a foldable chassis 12 mounting a pair of rear wheels 14, 16 and a front wheel 18

The foldable chassis of the trolley includes a central element 20, formed of a rigid hollow section square tube, and a pair of side elements 22, 24. In this embodiment, the side elements are also formed of square section tubes, the side elements 22, 24 having a smaller cross-sectional area than the central element 20. The side elements 22, 24 are pivotally mounted to the central element 20, at pivot points 26, 28 close to an end of the central element 20. The pivotal mount is effected by means of a pair of planar extensions 88, 90 protruding from a rear section of the central element 20, the side elements 22, 24 being pivotally mounted between the extensions, on an axis perpendicular to the planar extensions. The extensions 88, 90 are in a plane which is at an acute angle to a plane which is parallel with a line between the two rear wheels 14, 16 and also parallel with a longitudinal axis of the central element 20, the two planes intersecting at the longitudinal axis of the central element. In use and as shown in the Figures, the extensions 88, 90 extend sideways and slightly downwards from the central element 20.

The side elements 22, 24 mount respectively wheels 14, 16, each wheel 14, 16 being pivotally mounted to the end of each side element 22, 24 which is not pivotally mounted to the central element. The wheels each have a wheel mount extending from a rear face of each wheel, the wheels being rotatably mounted to the wheel mounts about their centre. The wheel mounts are formed as a pair of planar extensions 30, 32, the planar extensions extending from lines either side of the centre of the wheel. The side elements 22, 24 are pivotally mounted between the planar extensions 30, 32, and are pivotable in a plane parallel to and between the planes of the extensions.

In addition to the side elements 22 or 24, each wheel 14, 16 is pivotally mounted to the central element 20 by means of a linkage 34, 36. The linkage, like the side element, is pivotally mounted between the planar extensions 30, 32, at a point on the other side of the centre of the wheel from the pivot point of the side element.

A handle 38 (only partially shown in FIGS. 1 and 3, and best seen in FIG. 2) is pivotally mounted to the rear of the central element 20. The handle includes a lower portion 40 which is formed of a single bar 44, and an upper portion 42 formed of two parallel bars 47, 48. The lower portion is pivotally mounted to the upper portion via a mounting block 50, which includes two coaxial cylindrical sections, a first section 52 being rotatable within a second section 54, and extending out of either end of the second section 54. The single bar 44 of the lower portion is attached to the second section 54 of the mounting block 50, and the bars of the upper portion 47, 48 are attached to the first section 52 of the mounting block 50, at either side of the second section 54.

The in-use (operative) position of the upper portion 42 of the handle 38 can be adjusted to suit the user, by pivoting the upper portion 42 with respect to the lower portion 40 about the mounting block 50.

The front wheel 18 is mounted to the front of the central section 20, i.e. at the opposite end of the central section 20 to the handle 38. The front wheel is mounted on a pair of pivoting spars 56, which clamp around the wheel at its centre, and which pivot about either side of the central section 20. The pivoting spars 56 pivot in planes parallel with and at either side of the plane in which the lower portion 40 of the handle pivots.

With specific reference to FIG. 3, the folding mechanism of the golf trolley 10 will now be described. A first gear 58 is provided at a lower end of the handle 38, and is in meshing engagement with a first rack 60. The first rack is slidably mounted within the hollow central element 20. Note that the hollow central element 20 is not shown in FIG. 3, but in the embodiment completely covers the mechanism, as seen in FIG. 1. The first gear 58 has a central axis at the pivot point between the handle 38 and the central element 20, and includes teeth in a curve, preferably an arc, at least in part surrounding the central axis. As the handle is pivoted with respect to the central section 20, the first gear 58 will rotate about the pivot point. As a result, the rack will move linearly in a direction parallel with a longitudinal axis of the central element 20. The first gear 58 is provided clamped between two retaining sections 61. A space is provided above the gear 58 as seen in the Figure, between the gear 58 and the handle 38. The space allows for the gear to be substantially enclosed by covers, as seen in FIG. 1.

In the embodiment shown, the handle folds forwards from an operative position to a stowed position. As it does so, the first rack 60 is driven backwards, away from the front wheel 18. Second 62 and third (hidden in the Figure) racks are provided as part of the same linearly movable member 64 as the first rack 60.

Second and third gears 66, 68 are provided, one on each side element 22, 24. The second and third gears 66, 68 are mounted to an end of each side element, with a central axis of the gear at the pivot point between the side element and the central element 20 of the chassis. The second gear is in meshing engagement with the second rack and the third gear is in meshing engagement with the third rack. As such, when the handle is pivoted, forwards and the first rack is driven backwards, the side elements 22, 24 are pivoted forwards, towards the front wheel 18.

At a front end of the linearly movable member 60, a fourth rack 70 is provided. The fourth rack is rigidly attached to the first, second and third racks 64, 66, and so moves with the first, second and third racks 64, 66. A fourth gear 72 is provided at the pivot point between the central element 20 and the pair of pivoting spars 56 which mount the front wheel 18. The fourth gear 72 is driven by the fourth rack 70, and sits above the fourth rack 70 in use and as shown in the Figures. When the fourth rack 70 moves backwards with the other racks, the pivoting spars 56 pivot underneath a front portion of the central element 20, tucking the front wheel 18 underneath the central element.

The gear train 76 arrangement is enclosed within casing, as seen in FIG. 1. No exterior linkages are required, and the golf cart can be folded and unfolded in a single motion, by pivoting the handle 38 with respect to the central element 20. A golf bag can be configured on the golf trolley in the bag holder 86.

In use, the trolley 10 is stored and carried in the folded condition, as shown in FIG. 2. The handle locks in position enabling carrying, and the trolley can be rested with the handle substantially vertically disposed.

Figure 4:
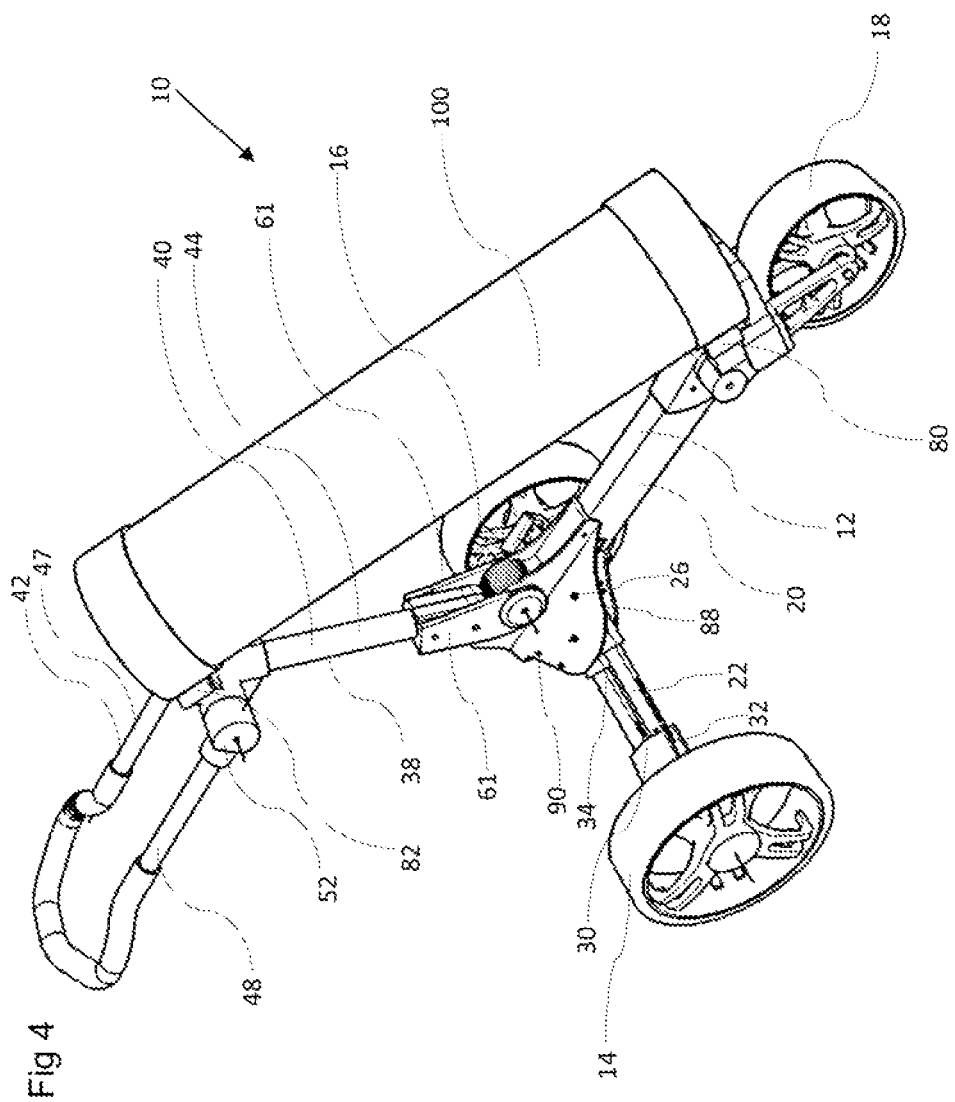
FIG. 4 shows a perspective view of the golf trolley in FIG. 4, in an operative position and transporting a golf bag.

As seen best in FIG. 4, the golf trolley 10 includes receiving means for receiving a golf bag 100. In the example shown the receiving means comprises a pair of clamps 80, 82, located at the top and bottom of the trolley, one above the front wheel 18 and one near mounting block 50. The receiving means may alternatively be straps, jaws, or anything else suitable for holding the bag 100 on the trolley 10.

The embodiments described above are provided by way of example only, and various changes and modifications will be apparent to persons skilled in the art without departing from the scope of the present invention as defined by the appended claims.

What is claimed:

1. A golf trolley comprising:
a foldable chassis,
a bag holder for receiving a golf bag,
a plurality of wheels for engagement with the ground the wheels being movable between an operative position and a stowed position,
a handle, and
a gear train in connection with the foldable chassis for folding elements of the chassis with respect to one another, and for moving the wheels between the operative and stowed positions, the handle being pivotally mounted to the chassis and including a first gear, the first gear being in meshing engagement with the gear train for controlling the folding of the chassis by movement of the handle
wherein the gear rain includes a first rack, the first rack being in meshing engagement with the first gear of the handle, and in use the first rack moving linearly within the chassis when the handle is pivoted with respect to the chassis;
a second rack, the second rack being rigidly attached to the first rack, and the first and second racks being disposed along substantially parallel or in-line axes.

2. A golf trolley as claimed in claim 1, in which the gear train is disposed substantially internally of the foldable chassis.

3. A golf trolley as claimed in claim 1, in which the first and second racks have toothed faces facing in different directions.

4. A golf trolley as claimed in claim 1, in which the foldable chassis includes a central element and a first side element, the first side element mounting a wheel and being pivotable with respect to the central element.

5. A golf trolley as claimed in claim 4, in which the first and second racks are slidably mounted to the central element.

6. A golf trolley as claimed in claim 5, in which the first side element includes a second gear, the second gear being in meshing engagement with the second rack, and in use the first side element pivoting with respect to the central element when the first and second racks move with respect to the central element.

7. A golf trolley as claimed in claim 6, in which the second gear has teeth disposed in a curve, the curve being in substantially the same plane as a longitudinal axis of the first side element.

8. A golf trolley as claimed in claim 4, in which the first side element is pivotally mounted to its respective wheel, and in which a first linkage is provided, the first linkage being pivotally mounted to the central element about a point spaced from the pivotal mount of the first side element to the central element, and the first linkage being pivotally mounted to the wheel associated with the first side element about a point spaced from the pivotal mount between the first side element, and the wheel, in use, the wheel pivoting with respect to the first side element as the first side element pivots with respect to the central element.

9. A golf trolley as claimed in claim 1, in which the gear train further includes a fourth rack, the fourth rack being rigidly attached to the first rack and being spaced from the first rack in a direction parallel with a longitudinal axis of the central element.

10. A golf trolley as claimed in claim 9, in which the foldable chassis further includes a front element, the front element mounting a wheel and being pivotally mounted to the central portion.

11. A golf trolley as claimed in claim 10, in which the front element includes a fourth gear, the fourth gear being in meshing engagement with the fourth rack, and in use the front element pivoting with respect to the central portion when the first and fourth racks moves with respect to the central portion.

12. A golf trolley as claimed in claim 9, in which the fourth rack has a toothed face facing in substantially the same direction as a toothed face of the first rack.

13. A golf trolley as claimed in claim 12, in which the fourth gear has teeth disposed in a curve, the curve being in a plane substantially parallel with and spaced from an elongate pivoting spar of the front element.

14. A golf trolley as claimed in claim 13, in which the elongate pivoting spar is rigidly connected to the axis of rotation of the fourth gear, and mounts the wheel associated with the front element.

15. A golf trolley as claimed in claim 11, in which the elongate pivoting spar moves in a plane parallel with a longitudinal axis of the central element.

* * * * *